United States Patent [19]

Kaes

[11] Patent Number: 4,919,497
[45] Date of Patent: Apr. 24, 1990

[54] TESTS OF ELECTROHYDRAULIC SWITCHING VALVES WITH FLUIDIC BALL ELEMENTS

[75] Inventor: Guenter Kaes, Stuttgart, Fed. Rep. of Germany

[73] Assignee: Robert Bosch GmbH, Stuttgart, Fed. Rep. of Germany

[21] Appl. No.: 227,398

[22] Filed: Aug. 3, 1988

[30] Foreign Application Priority Data

Aug. 4, 1987 [DE] Fed. Rep. of Germany ....... 3725810

[51] Int. Cl.⁵ .......................... B60T 8/36; F16K 31/02
[52] U.S. Cl. ................................ 303/119; 251/129.02; 251/129.21; 251/129.05
[58] Field of Search ........................ 303/113, 115, 119; 60/591; 239/585; 251/129.02, 129.14, 129.15, 129.21, 129.05, 129.07, 129.08, 325

[56] References Cited

U.S. PATENT DOCUMENTS

| | | | |
|---|---|---|---|
| 2,614,584 | 10/1952 | Goepfrich | 251/129.21 |
| 2,638,118 | 5/1953 | Chandler | 251/129.21 |
| 3,719,401 | 3/1973 | Peruglia | 303/119 |
| 3,836,207 | 9/1974 | Belart | 303/115 |
| 3,873,063 | 3/1975 | Illing | 251/325 |
| 3,877,758 | 4/1975 | Kuwana | 303/115 |
| 4,138,165 | 2/1979 | Blomberg et al. | 303/115 |
| 4,155,603 | 5/1979 | Harries | 303/119 |
| 4,421,278 | 12/1983 | Kienzle et al. | 239/585 |
| 4,422,695 | 12/1983 | Farr | 303/115 |
| 4,579,137 | 4/1986 | Brandt, Jr. | 251/129.08 |
| 4,640,558 | 2/1987 | Nomura et al. | 303/119 |
| 4,750,705 | 6/1988 | Zippe | 251/129.15 |
| 4,765,693 | 8/1988 | Stegmaier | 303/119 |

FOREIGN PATENT DOCUMENTS

| | | | |
|---|---|---|---|
| 0055518 | 7/1982 | European Pat. Off. | 251/129.05 |
| 3337259 | 4/1985 | Fed. Rep. of Germany | 251/129.05 |

OTHER PUBLICATIONS

"Tests of Electrohydraulic Switching Valves with Fluidic Ball Elements", German Aeronautics and Space Travel, Research Report 73-35.

Primary Examiner—Robert J. Oberleitner
Assistant Examiner—Timothy Newholm
Attorney, Agent, or Firm—Edwin E. Greigg

[57] ABSTRACT

A magnetic valve with reversible flow for use in anti-skid brake systems (ABS) has an armature displaceably supported in a valve housing within a control coil. A sealing element is moved by the armature and a stationary valve seat is associated with the sealing element. The armature includes a bottom which communicates via openings with an inflow region including the sealing element, a sealing element holder, and a valve body. The sealing element formed as a sealing ball and the sealing element holder formed as a perforated disk are embodied such that within predetermined stroke and flow ranges, an aspiration effect due to the flowing medium ensues, and a retaining element provided in the form of a permanent magnet acts upon the armature and the retaining element is overcome upon electrical triggering of the magnetic valve, resulting in a large flow cross section for normal braking, and a reduced flow cross section in ABS operation.

5 Claims, 2 Drawing Sheets $D_N = 2.5mm$
$D_K = 4mm$
$\alpha = 45°$
$P_S = 200kp/cm^2$

TESTS OF ELECTROHYDRAULIC SWITCHING VALVES WITH FLUIDIC BALL ELEMENTS

BACKGROUND OF THE INVENTION

The invention is directed to improvements in a magnetic valve. Magnetic valves of many kinds are known, for performing manifold switching functions. Typically, they include a valve housing, an armature movably supported in it; an electric exciter coil for actuating the armature; and in the hydraulic portion controlled by the movement of the armature, the valve body, which forms the seat for the sealing element, such as a sealing ball; connecting means that couple the thus-embodied ball valve to the armature movement; and a biasing spring, which determines a specified switching state of the valve.

In the simplest case, the valve may be in the form of a 2/2-way valve, that is, a valve having a valve inlet and a valve outlet, which is movable into two switching positions, namely the closing and the opening position of the valve. Such 2/2-way valves are in fact often incorporated into the brake lines of motor vehicles, to achieve so-called ABS or anti-skid braking functions. In the closing position, they can prevent the delivery of additional hydraulic fluid to the wheel brake cylinders (in the maintaining function) and as needed, with further parallel-acting magnetic valves, may also enable a pressure drop, or upon a shift to the open position may permit a further pressure buildup.

The following discussion addresses the design and function of such a 2/2-way magnetic valve for achieving ABS functions, because this is also a preferred field for the use of the present invention. Since such ABS magnetic valves necessarily remain continuously in place in the brake lines, they must present the maximum possible flow cross section for the frequent case of normal braking, yet for ABS functions this feature is undesirable, since precisely in the ABS situation it is the primary purpose of the system to lower the brake pressure at first, so as to eliminate the tendency for the vehicle to skid, and then to maintain it as needed at a given level, then (gradually) build it up again, and so forth, with a rapid succession of commands issued by a central control system in response to wheel sensor signals.

Since typically a 2/2-way valve can be moved only either completely into the open position or completely into the closed position, for the time being disregarding the possibility of an incremental operation, a standard 2/2-way magnetic valve would therefore, upon receiving the control command "OPEN", shift entirely to the open position, with the large flow cross section that is desired for normal braking, and a correspondingly steep rise of pressure in the brake cylinders would ensue. This is often unfavorable for ABS control; on the other hand, such valves cannot function with a smaller cross section, or else time would be lost for the pressure buildup required should fast braking become necessary.

OBJECT AND SUMMARY OF THE INVENTION

It is accordingly a principal object of the invention to devise a magnetic valve with reversible flow, in particular for use in ABS operation, which does not require any separate reversing means acting upon it from outside, and which, while maintaining a given basic design in its entirety, enables a change to a smaller flow cross section whenever the triggering of its magnetic portion causes a transition to ABS operation.

The invention attains this object and has the advantage over the prior art that, without any mechanical modification whatever and without any other change except for the triggering of the coil, which is necessary in any event for the transition to ABS operation, an effective flow cross section reduction can be attained, which is made possible by the intelligent exploitation of certain hydraulic properties arising in the vicinity of the valve seat (valve body) and sealing element. Hydraulic effects, known as a so-called "hydrodynamic paradox" and expressed in the pulling of the sealing element toward the outflow opening of the valve, do in fact arise in valves, for instance electrohydraulic switching valves having fluidic ball elements as sealing elements. This hydrodynamic paradox is discussed, for example, in the publication by K. H. Post, "Untersuchungen an elektrohydraulischen Schaltventilen mit fluidischen Kugelelementen" [Tests of electrohydraulic switching valves with fluidic ball elements], Deutsche Luft- und Raumfahrt, Forschungsbericht 73-55 Institut fur Flugfuhrung, Braunschweig [German Aeronautics and Space Travel, Research Report 73-35, Institute for Flight Guidance, Braunschweig, Federal Republic of Germany].

The necessary descriptive subject matter is as follows:

Effect of the Deflection Geometry

The goal of these experiments was to vary the flow forces with structurally simple deflection arrangements. A series of experiments with a ball secured on the tappet as in FIG. 2 and with various outflow chamber diameters showed that this had no measurable effect. A comparison of the ball secured freely on the tappet with one guided by an insert as in FIG. 3 (as in the inverter ball switch element, for instance) resulted in no difference.

To vary the flow forces in a ball guided by means of an insert, flow deflection downstream of the chamfer, attached to the housing, is compelled by the outflow angle S. FIG. 4 shows, on the left, the change in the courses of the flow force at an angle S - 135°. The flow forces become approximately 30% less with small openings, and with large openings flow forces in the opening direction arise. While the outflow in the case of small openings is determined primarily by the chamfer angle a with corresponding flow forces in the closing direction, the effect of the chamfer vanishes with large openings, and the additional flow deflection becomes operative.

To reinforce this deflection effect, a deflector body was firmly connected to the ball in motion (see FIGS. 2 and 4). FIG. 4, on the right, shows the course of the flow force thereby attained. The zero gap n has considerable influence in the closed position of the valve. Flow forces in the opening direction once again do not arise until there are long opening strokes $h/D_N$ 0.1.

Flow forces that at minimally short strokes ($h/D_N$ 0.05) are already operative in the opening direction would be of interest for magnetic valves having 3/2-way function, because at the onset of motion they would generate an additional effect that would accelerate the motion process. In ball valves, however, this effect cannot be attained with simple and reliable seat geometries.

Effect of the Chamfer

In FIG. 5, the course of the flow force at outflow are shown for three different chamfer widths, under otherwise identical conditions. Only with the sharp-edged seat (here $f/D_N=0.086$) do considerable deviations occur as compared with normal seat widths. The courses of the flow force for the two larger chamfer widths $f/D_N=0.0161$ and $f/D_N=0.214$ are virtually identical. With the sharp-edged seat, the flow forces are considerably less, and with long strokes they even change their operative direction in the opening direction.

This aspiration action is made use of by the invention, when ABS control is installed in motor vehicle and the like, in a desired manner for throttling the flow; to this end, the resultant aspiration action upon the sealing element in the outflow region is shifted into the vicinity of the armature bottom in a practical embodiment of a magnetic valve, for attaining defined conditions in the flow behavior of the valve.

It is therefore an advantageous feature of the present invention that the flow reversal requires no additional components in the vicinity of the magnetic valve, and only a simple form of retaining element, which may for instance be a permanent magnet or a catch spring, need be provided for the armature, in order to assure that the throttling action on the cross section has no effect in normal braking.

A particularly advantageous feature is the embodiment of the retaining element, which limits the use of the reduced flow cross section to ABS operation, in the form of a permanent magnet, from which the armature is as it were torn away and can close in response to the provision of current to the valve (ABS function).

The invention will be better understood and further objects and advantages thereof will become more apparent from the ensuing detailed description of a preferred embodiment taken in conjunction with the drawing.

DESCRIPTION OF THE PREFERRED EMBODIMENT

The basic concept of the present invention is based on the recognition that the so-called hydrodynamic paradox discussed above, which at certain valve strokes and at certain flow rates exerts an aspirating effect on the sealing element located in the open position of the valve, can be exploited, with suitable embodiment of the hydraulic effects that prove effective for a magnetic valve with reversible flow, so that a corresponding adaptation of given properties in the vicinity of the outflow opening of the valve is achieved. As a result, the hydraulic force released in the form of aspiration by negative pressure can be absorbed into the overall behavior of the valve, and an adaptation of the forces acting upon the armature, in combination with an additional armature retaining element, can be realized with a view to the reversibility of the flow.

Figure 1:
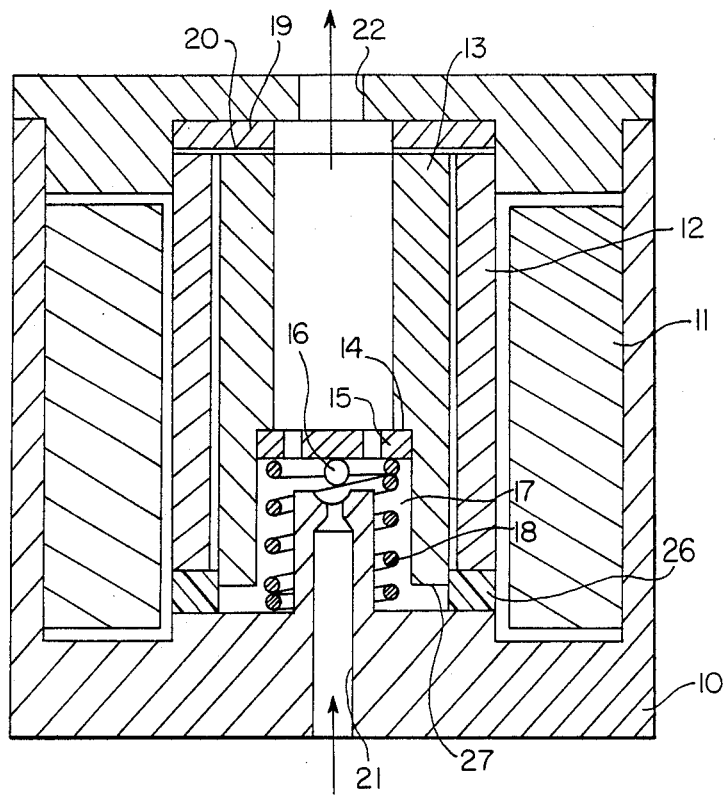
FIG. 1 shows an embodiment of a magnetic valve according to the invention in simplified form.
Figure 2:
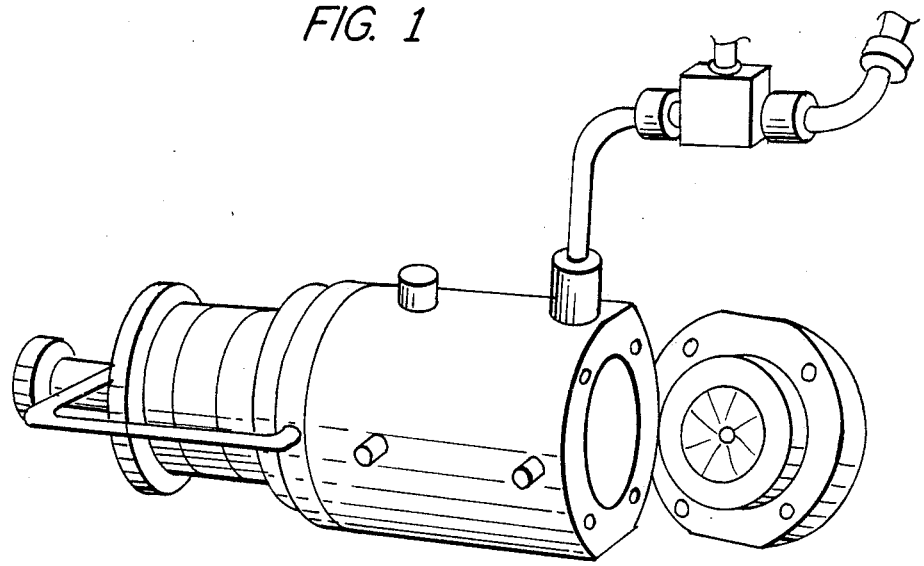
FIGS. 2-5 are prior art devices used for determining fluid flow relative to a ball valve.
Figure 3:
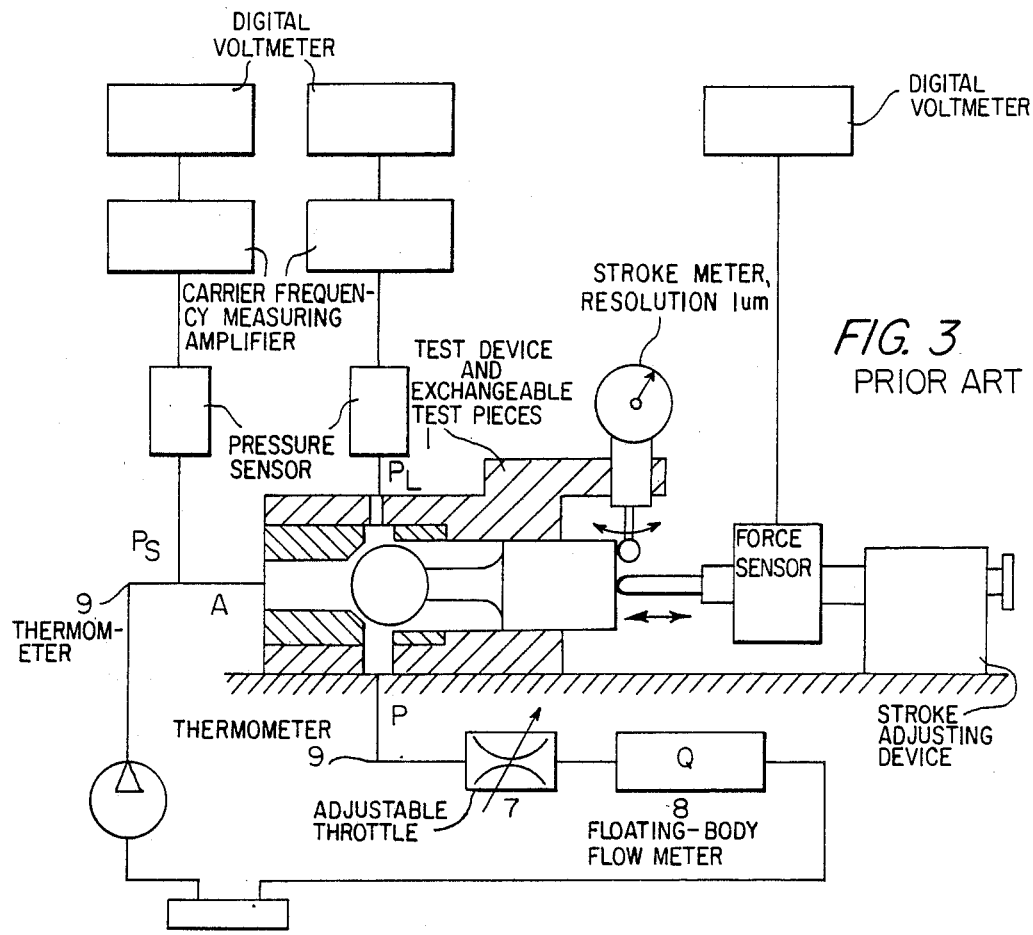
Figure 4:
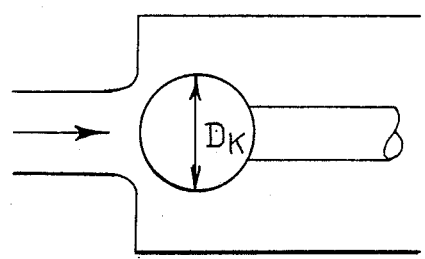
Figure 5:
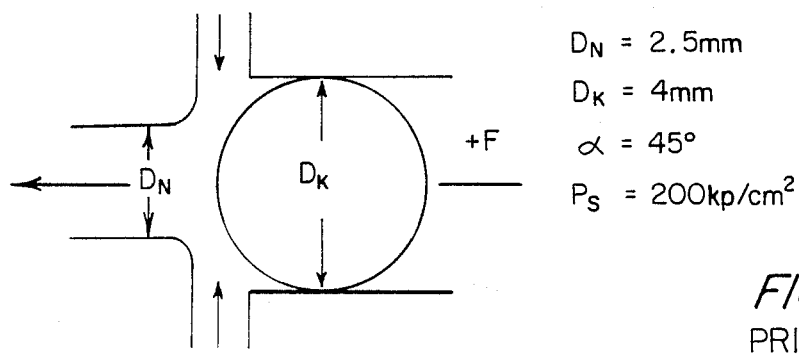

The basic structure and function of the present invention are described below, referring to the drawing, FIG. 1.

The valve housing 10 is cup-shaped, and in its interior it supports both the exciter coil 11 and a tubular armature guide 12, in which the armature 13, under the influence of the magnetic field built up by the exciter coil 11, executes a sliding displacement, which in the exemplary embodiment shown corresponds to a closing movement of the valve. To this end, in a shoulder 14, the armature 13 receives a sealing element holder 15, for instance in the form of a perforated disk, which bears the actual sealing element 16 in the form of a sealing ball. Opposite the sealing element 16 is the valve seat, embodied by a valve body 17; in the exemplary embodiment shown, it is surrounded by a restoring spring 18 for the armature 13, the restoring spring being supported on both the sealing element holder 15 and the valve housing bottom. This structure is supplemented with a permanent magnet 19, in this case annular in embodiment, and a shim 20 of nonmagnetic material, which forms a remnant air gap between the armature 13 and the permanent magnet 19. The valve inlet is shown at 21 and the valve outlet at 22. The flow direction of the fluid to be steered by the magnet is represented by the arrows. An annular seal 26 is placed between the bottom end of the tubular armature guide 12 and the housing 10. The lower end 27 of the armature extends into the inflow chamber area surrounded by the seal so that in the non-excited state sufficient spacing remains between the end 27 of the armature and the bottom of the inflow chamber to permit movement of the armature to close the valve 16, 17.

The present invention develops the reversing mechanism that thereby becomes possible on the principle pertaining to such ball valves, that is, that the resultant hydraulic force of the hydraulic medium, as a product of aspiration and expulsion, acts within wide limits to produce aspiration.

The following function therefore results. First, by the use of the retaining element, that is, in the present exemplary embodiment the permanent magnet 19, although it may also be a catch spring, it is attained that in normal braking the armature 13 remains in its outset position, in contact at the top as shown in the plane of the drawing, retained by the permanent magnet and with the exciter coil 11 not supplied with current. If ABS functions begin, then upon the supply of current to the valve, the armature is torn from the retaining element, and the valve closes in the usual manner.

Subsequently, if in the course of varying ABS functions the valve is rendered current less so that pressure can (again) be built up, then because of the explanation given above, via this hydraulic effect, the in flowing medium prevents the armature from immediately returning to its outset position, resulting in a throttled inflow as compared with normal braking, and this inflow due to the spacing between the valve body 17 and the sealing element 16 retained by the sealing element holder is readily kept within predetermined limits.

In one feature of the invention, this initially basically defined course of events can be further reinforced by making electrical wiring provisions at the valve, for instance using a temporally limited current overshoot means to tear the armature loose from the position of repose (open position of the valve) and additionally preventing the armature from returning overly forcefully into the open position, by supplying a pulsed trigger current, in order to reinforce the hydraulic effect.

It thus becomes possible, by means of the retaining element, to set the valve to a large flow cross section for normal braking, so that a desired brake pressure can be built up rapidly, while in ABS operation the retaining element is not operative, and the hydraulic effect produces an intentional throttling (flow cross section reduction), which keeps the flow via the pressure region substantially constant and resulting in favorable conditions for ABS control. Since conventional ABS valves can be provided with a flow reversal in this way, cost economies are attained as compared with the use of separate reversing valves.

The foregoing relates to a preferred embodiment of the invention, it being understood that other variants and embodiments thereof are possible within the spirit and scope of the invention, the latter being defined by the appended claims.

What is claimed and desired to be secured by Letters Patent of the United Sates is:

1. A magnetic valve with self regulation of a flow medium for use in anti-skid brake systems (ABS), having large flow cross section for normal braking and a reduced flow cross section in ABS operation, comprising a valve housing (10), a control coil (11) in said valve housing, a tubular armature (13) displaceably supported within said control coil, a valve body (17) in said housing, a stationary valve seat on said valve body (17), a sealing element holder (15) in said valve housing which is carried by said armature, a sealing element (16) on said sealing element holder which is moved by the armature relative to said stationary valve seat, a valve opening spring which applies a valve opening force on said sealing element holder to slowly enlarge an opening cap between said valve body (17) and the sealing element (16), said armature having a bottom portion (27) that communicates with an inflow region of said valve housing, said inflow region encompassing said sealing element (16) associated with said sealing element holder (15), the sealing element (16) and the stationary valve seat being formed and disposed such that within a predetermined stroke and flow ranges, an aspiration effect due to the flowing medium ensues due to fluid flow from an inlet in said valve body via said valve seat through said gap to an outlet (22), and a retaining means adapted to act upon the armature (13) counter to suction forces created by said aspiration effect, which after termination of an electrical excitation of said control coil of the magnetic valve, forces emanating from strong aspiration effects are overcome due to increasing flow rates and said retaining means is able to move said armature and said sealing element (16) a full stroke away from said stationary valve seat when strong aspiration effects disappear below a pre-set limit.

2. A magnetic valve as defined by claim 1, which includes an armature guide (12) that surrounds the armature (13) with a narrow gap being provided therebetween such that on the axially opposed faces of the armature, because of the hydraulic effect of the flow medium to be steered, a pressure drop ensues which, after initiating a lifting of said sealing element from its valve seat, and given a maintained flow of medium, keeps the armature at a medium opening stroke corresponding to a reduced flow cross section.

3. A magnetic valve as claimed in claim 1, in which said retaining means comprises a permanent magnet (19).

4. A magnetic valve with self regulation of a flow medium for use in anti-skid brake systems (ABS), having a large flow cross section for normal braking and a reduced flow cross section in ABS operation, comprising a valve housing (10), a control coil (11) in said valve housing, a tubular armature (13) displaceably supported within said control coil, a valve body (17) in said housing, said valve body including a fluid flow inlet, a stationary valve seat on said valve body (17), a sealing element holder (15) within said tubular armature which is carried by said armature, a sealing element (16) on said sealing element holder which is moved by the armature relative to said stationary valve seat, a valve opening spring which applies a valve opening force on said sealing element holder to enlarge an opening gap between said valve body (17) and the sealing element (16), an inflow chamber disposed within said valve housing below said sealing element holder which communicates with said valve seat, said armature having a bottom portion provided with a lower end (27) extending into said inflow chamber below said valve seat, said armature further being slidably pressed into said coil in a manner of a servo piston, said inflow chamber encompassing said valve body, said sealing element (16) and the stationary valve seat being formed and disposed such that within a predetermined stroke and flow ranges, an aspiration effect due to the flowing medium ensues due to fluid flow from an inlet in said valve body via said valve seat through said gap to an outlet (22), a retaining means adapted to act upon the armature (13) counter to section forces created by said aspiration effect which, after termination of an electrical excitation of said control coil of the magnetic valve, forces emanating from strong aspiration effects are overcome due to increasing flow rates and said retaining means is able to move said armature and said sealing element (16) a full stroke away from said stationary valve seat when strong aspiration effects disappear below a pre-set limit.

5. A magnetic valve with self regulation of a flow medium for use in anti-skid brake systems (ABS), having a large flow cross section for normal braking and a reduced flow cross section in ABS operation, comprising valve housing (10), a control coil (11) in said valve housing, a tubular armature (13) displaceably supported within said control coil, a valve body (17) in said housing, a stationary vale seat on said valve body (17), a perforated disk sealing element holder (15) in said valve housing which is retained on a shoulder (14) of and carried by said armature, a ball type sealing element (16) secured to said perforated disk sealing element holder which is moved by the armature relative to said stationary valve seat, said armature having a bottom portion (27) that communicates with an inflow region of said valve housing, said inflow region encompassing said sealing element (16) associated with said sealing element holder (15), the sealing element (16) and the stationary valve seat being formed and disposed such that within predetermined stroke and flow ranges, an aspiration effect due to the flowing medium ensues, and a retaining means adapted to act upon the armature (13) counter to forces created by said aspiration effect which after termination of an electrical excitation of said control coil of the magnetic valve, forces emanating from strong aspiration effects are overcome due to increasing flow rates and which is able to move said armature and said sealing element (16) a full stroke away from said stationary valve seat when strong aspiration effects disappear below a pre-set limit.

* * * * *